March 17, 1964    C. G. MUNTERS ETAL    3,125,157
COMBINED HEAT AND MOISTURE EXCHANGER
Filed Feb. 2, 1955    3 Sheets-Sheet 2

March 17, 1964     C. G. MUNTERS ETAL     3,125,157
COMBINED HEAT AND MOISTURE EXCHANGER
Filed Feb. 2, 1955     3 Sheets-Sheet 3

United States Patent Office 3,125,157
Patented Mar. 17, 1964

3,125,157
COMBINED HEAT AND MOISTURE EXCHANGER
Carl Georg Munters, Danderydsvagen 3, Stocksund,
Sweden, and Per Gunnar Norbäck, Bergsliden 1C,
Lidingö, Sweden
Filed Feb. 2, 1955, Ser. No. 485,633
Claims priority, application Sweden Feb. 3, 1954
2 Claims. (Cl. 165—7)

Our invention relates to a combined heat and moisture exchanger.

More particularly our invention relates to an exchanger for two air currents, of which the one is constituted by air escaping from a room or compartment and the other by fresh air entering said room or compartment from the atmosphere.

In ventilating dwelling rooms during winter by means of a heat exchanger it is of essential importance with regard to heat economy to recover as much as possible of the heat contained in the air escaping from the room. This heat is thus to be transferred to the incoming cold atmospheric air so as to raise the temperature thereof when entering the room to approach the temperature of the latter. We have developed heat exchangers meeting very high demands in this respect. The heat exchanger may be formed with a rotor containing or composed of fine heat transfer filaments or still better having a filamentous structure arranged with narrow clearances as is disclosed in the co-pending abandoned patent applications Serial Nos. 387,656 and 442,686, filed October 22, 1953, and July 12, 1954, respectively, said construction resulting in very high coefficients of heat transfer.

There is, however, an additional problem in the ventilation of rooms during winter due to the fact that the atmospheric air in spite of its high relative moisture content because of its low temperature does not contain but a small quantity of moisture measured in the absolute sense. Thus, if atmospheric air having a relative moisture content of 90%, and a temperature of −20° centigrade is introduced into a room, the temperature in which is +20° centigrade, the relative moisture content of said introduced air upon heating thereof will be 5% only, a value much too low as to permit dwelling in the room with a feeling of comfort. An abundant supply of fresh air into a room though obvious highly valuable in itself is, of course, not desired to result in an almost complete dehydration of the air of the room.

One object of our invention is to provide an exchanger which besides possessing high heat economy is also capable of keeping and extracting the higher absolute moisture of the air escaping from the room so as to bring it to the benefit of the incoming fresh atmospheric air.

A further object of our invention is to moisen the incoming fresh atmospheric air without necessitating supply of water.

The extreme increase of the efficiency of the heat exchanger creates a further problem due to the fact that the escaping air can be cooled so much as to cause intersection with the pressure curve for saturated water vapour involving precipitation of condensate in the exchanger. If then the external temperature is below the freezing point the condensate in the form of ice may clog the rotor. This precipitation of ice is also connected with the relative moisture content of the air of the room and that of the atmospheric air. It is obvious that the danger of precipitation of ice increases to the same extent as the temperature of the atmosphere falls to extremely low value, i.e., at the same time when the load of the heating plant of a house or building attains its maximum and it therefore is particularly actual that the ventilation is capable of being performed with high efficiency. With regard hereto a further object of our invention is to provide a combined heat and moisture exchanger in which a full exchange of air may be performed under favourable conditions even at an extremely low external temperature.

When during summer the climate conditions are oppressive the relations are inversed in comparison to those related hereinbefore. Then the atmospheric air may have the higher absolute content of moisture in particular if the air in the room is conditioned, i.e., treated in order to lower the temperature and moisture content thereof. It will then be advantageous not to permit the atmospheric air to enter the room with its high moisture content kept unchanged. If besides the temperature thereof is high, it is highly useful to be capable of performing an air exchange without pumping large quantities of heat into the room. Still a further object of our invention is thus to provide an exchanger capable of meeting also these conditions prevailing in summer.

In this connection a still more particular object of our invention is to provide an exchanger capable of being brought into operation during both winter and summer with a minimum of readjustment.

Further objects and advantages of our invention will be apparent from the following description considered in connection with the accompanying drawings which form part of this specification and of which:

Figure 1:
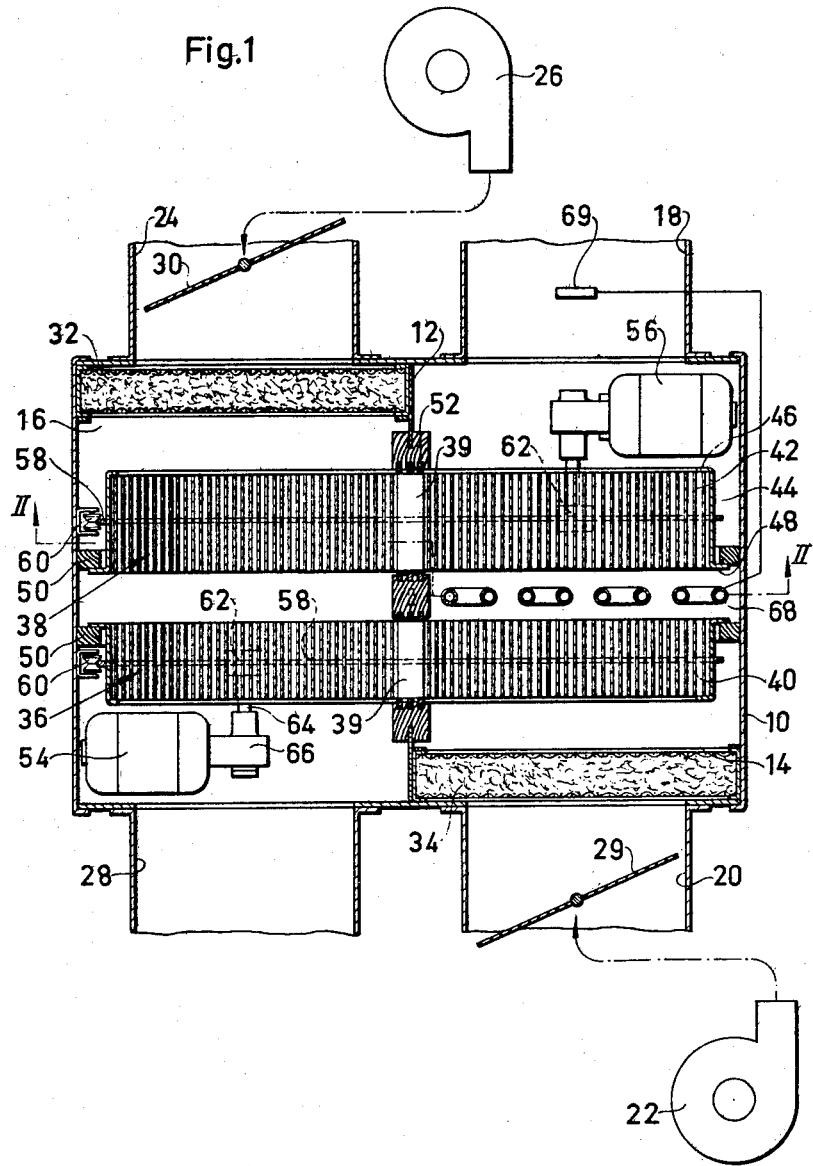
FIG. 1 is a sectional view taken on line I—I of FIG. 2 through an exchanger constructed according to our invention.

Referring to the drawings, 10 designates a housing of the apparatus divided by means of a partition 12 into two passages 14 and 16. Through a pipe socket 18 provided in the housing of the appaartus the passage 14 communicates with the atmosphere and through a pipe socket 20 and a fan 22 with a room or compartment to be ventilated. The passage 16 communicates through a pipe socket 24 and past a fan 26 with the atmosphere and through a pipe socket 28 provided in the housing of the apparatus with the room or compartment. Preferably the pipe sockets 20 and 24 include valve members such as dampers 29, 30. Immediately adjacent the pipe socket 24 a filter 32 is to be traversed by the air from the atmosphere prior to its entrance into the passage 16. Also the air escaping from the room is cleaned in a filter 34 prior to its entrance into the apparatus. The two filters may be of a known kind and are suitably constituted by easily exchangeable units.

Figure 2:
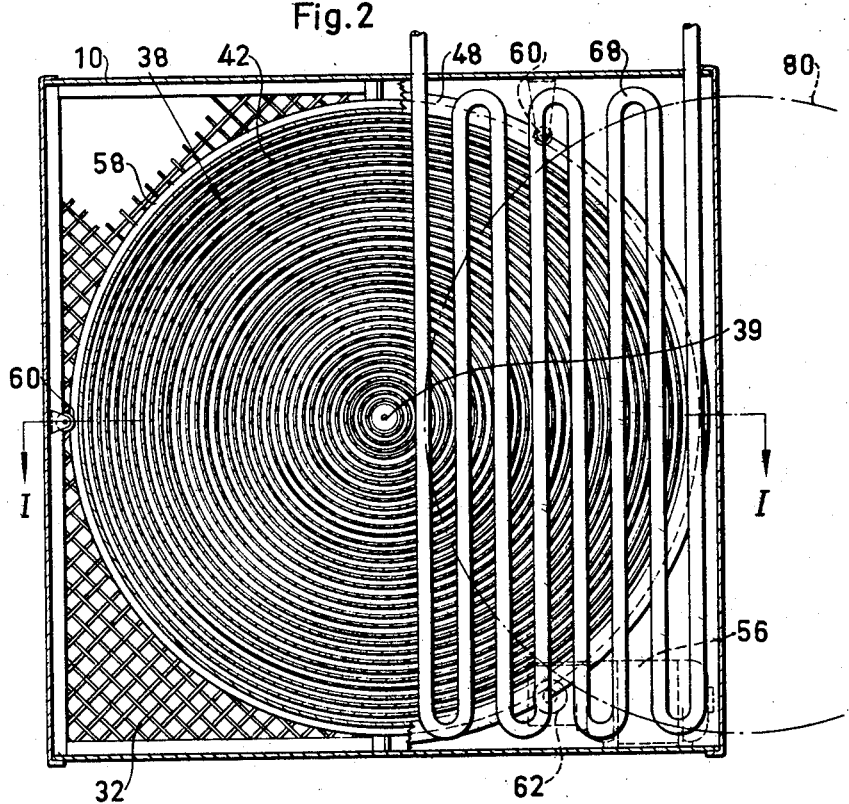
FIG. 2 is a sectional view taken on line II—II of FIG. 1.

In the embodiment illustrated in FIGS. 1 and 2 the apparatus comprises two transfer bodies having in the embodiment shown the form of rotors generally designated by 36 and 38. They consist preferably of webs 40 and 42, respectively, wound in the shape of a spiral about a hub 39 and preferably composed of layers of which one is plane and the other corrugated or provided with projections of other shape as is disclosed more detailed in the co-pending abandoned patent applications Serial Nos. 442,686 and 442,687, both filed July 12, 1954. The layers form between themselves narrow clearances extending in parallel to the shaft of the rotor.

The web roll is inserted into a drum-shaped rim 44 one edge of which is bent inwardly around the roll as is indicated at 46. The other edge has an outwardly bent flange 48. The rim 44 extends through and is sealed against a circular opening in a partition 50 rigidly secured to the housing 10. Each of the rotors extends transversely through the two passages 14 and 16 and is sealed against the partition 12, for example by means of packings 52 formed according to the labyrinth principle so as to minimize direct overflow of air from the one passage to the other. Though the rotors may be driven by a common motor, each of them in the embodiment shown has an individual driving motor 54 and 56, respectively. On its external face the rim 44 carries an annular member 58 bearing against three supporting rolls 60 rotatably mounted on the interior face of the casing and suitably shaped as double-cone bodies. The annular member 58 is further in driving contact with a pulley 62 carried by a shaft 64 and driven through a gear 66 by the driving motor 54 or 56, respectively. The passage 14 between the two rotors includes means for heating the air and presented in the illustrated embodiment as a heating element 68 possibly operated by electricity. The supply of heat to the element 68 may be adjustable by means of a hygrostate 69 located in the outlet 18 from the passage 14.

The transfer body of the rotor 36 is hygroscopic so as to be capable during rotation of the rotor not only to transfer heat but also to transfer moisture from one air stream to the other. Though it does not constitute a condition it is advantageous that the transfer body of the rotor 38 has the same hygroscopic properties while at the same time being a good heat exchanger. As will be evident from the specifications referred to above a body composed of lamelliform superimposed layers attains high coefficients of transfer with respect to both heat and moisture provided that the individual layers are arranged in a spaced relation of an average magnitude less than 1.5 mm. and preferably less than 1 mm., for instance 0.2–0.6 mm. This implies that in the structure described above where the web rolls are composed of alternately plane and corrugated layers the spacing between the first mentioned layers is at the utmost 3 mm. and preferably less than 2 mm. Said layers may be hygroscopic due to their own nature as is the case with certain paper qualities, particularly if wool fibres or fibres of other hygroscopic materials are contained in the paper. A woolen fibre absorbs twice as much moisture as a wood or cellulose fibre. In books of reference the hygroscopicity is determined by the quantity of water which a substance is capable of absorbing at a predetermined relative moisture content, for example grams of water per 100 grams of the substance calculated in completely dry state.

The layers may also consist of a sheet or foil-shaped carrier bearing an addition or a cover of a hygroscopic substance, such as finely ground silica jelly.

During winter the apparatus operates in the following manner. The external air of the atmosphere may be supposed to have a temperature of −20° C. At so low temperatures its relative moisture content is always very high and may be assumed to be 90%. The air in the room has a temperature of +20° and in the room a relative moisture content of the air of 60% shall be maintained. By reasons to be explained hereinafter the external air is supposed to have been heated in the exchanger 38 to +20° and at the same time its relative moisture content reduced to between 20 and 30%. This heated fresh air passing through the rotor 36 in the passage 16 is influenced by the air escaping from the room and streaming in the passage 14 during the rotation of the rotor in a manner such as to cause the escaping air to deliver part of its moisture to the preheated air so that this latter depending on the efficiency of the rotor attains a relative moisture content immediately below 60%. The temperature is the same as that of the air of the room, namely +20°. The escaping air behind the rotor 36 still has a temperature of +20°. In this rotor a transfer of moisture only has been effected, the escaping air having been deprived of moisture, which has been transferred to the incoming fresh air.

By the element 68 heat is supplied to the escaping air of the room but only so much as to raise its temperature to +25°, for example. In the rotor 38 a combined exchange of heat and moisture is effected. The incoming cold atmosphere air is heated to +20° C. as has been assumed above, and the air escaping from the room delivers a corresponding quantity of heat so that its temperature when leaving the apparatus is −15° C., for example, and its relative moisture content is immediately below 100°. Part of the moisture content of the escaping air has at the same time been transferred to the incoming air. The supply of heat to the heating element is necessary in order to avoid condensation of moisture in the rotor 38 or the outlet from the passage 14.

In the example now in consideration the temperature and moisture conditions have been assumed to be such as to cause the rotor 36 to operate solely as moisture exchanger. The required exchange of heat is then effected by means of the rotor 38. Hereby one has deliberately slightly deteriorated the efficiency of the exchanger with respect to temperature in order to avoid condensation of moisture in the exchanger as explained hereinbefore. To explain the same result with other words the exchanger's capacity to transfer moisture without causing condensation has been increased and as a consequence thereof the relative moisture allowed in the room.

However, if there is a desire under the extreme conditions assumed above of the atmosphere to avoid any reduction of the efficiency with respect to the temperature it is possible by means of the dampers 29 and 30 to reduce the quantities of air passing during a unit of time through the passages 14 and 16. In the same manner as described above the supply of heat to the element 68 may be controlled so as to cause the rotor 36 mainly to transfer moisture and thus not at all or to a minor extent only to transfer heat. Simultaneously with the measure just described of imparting to the exchanger the maximum efficiency with regard to temperature by reducing the quantities admitted of air, its efficiency with respect to transfer of moisture will be increased so as to improve its capability of transferring moisture without causing condensation. Which of the two forms of operation hereinbefore described—large air quantity and slightly reduced efficiency with regard to temperature or higher efficiency of said kind and slightly reduced air quantity—is to prefer in the individual case depends mostly on the conditions existing in the room to be ventilated and/or conditioned.

The heat supply to the element 68 may, however, be adjusted so as to let the incoming fresh air behind the rotor 38 have a temperature lower than that of the air of the room. Such adjustment may be suited for a less pressing external winter climate with atmosphere temperature approaching 0°. Then the rotor 36 becomes active even as means of heat transfer. If the temperature of the fresh air behind the rotor 38 is +10°, for example, the rotor 36 has to raise said temperature to approximately that of the air of the room. If the supply of heat to the heating element 68 is interrupted entirely, the share of the rotor 36 in the heat transfer reaches the maximum value and is in such relation to the heat transfer by the rotor 38 as is determined by the ratio of the surfaces, the coefficient of heat transfer and the number of revolutions of the two rotors. As an alternative it may be advantageous to supply so much heat to the element 68 as to raise the temperature of the fresh air behind the rotor 38 to surpass that of the air of the room. The usual aim is, however, to supply a so small quantity of heat as possible to the element 68. In most cases the room is provided with other heating means also, for example radiator heaters. The heating element may even be disposed in the passage 16 between the two rotors in which case the manner of operation principally will be the same as hereinbefore described.

By means of the hygrostat 69 the supply of heat to the element 68 can be controlled automatically so as on fluctuations of the atmosphere conditions always to keep the relative moisture in the exchanger and the outlet 18, respectively, below 100%. The dampers 29, 30 may be adjustable manually or even automatically in response to the temperature of the atmosphere.

During summer the element 68 is shut off and the exchanges has at higher temperatures and moisture content of the atmosphere to counteract penetration of heat and moisture into the room or compartment which possibly is conditioned. The exchanger operates then with both rotors acting as heat and/or moisture transfer means depending on the existing conditions, the only difference being that the transfer is effected from the incoming atmospheric air to the air escaping from the room.

Figure 3:
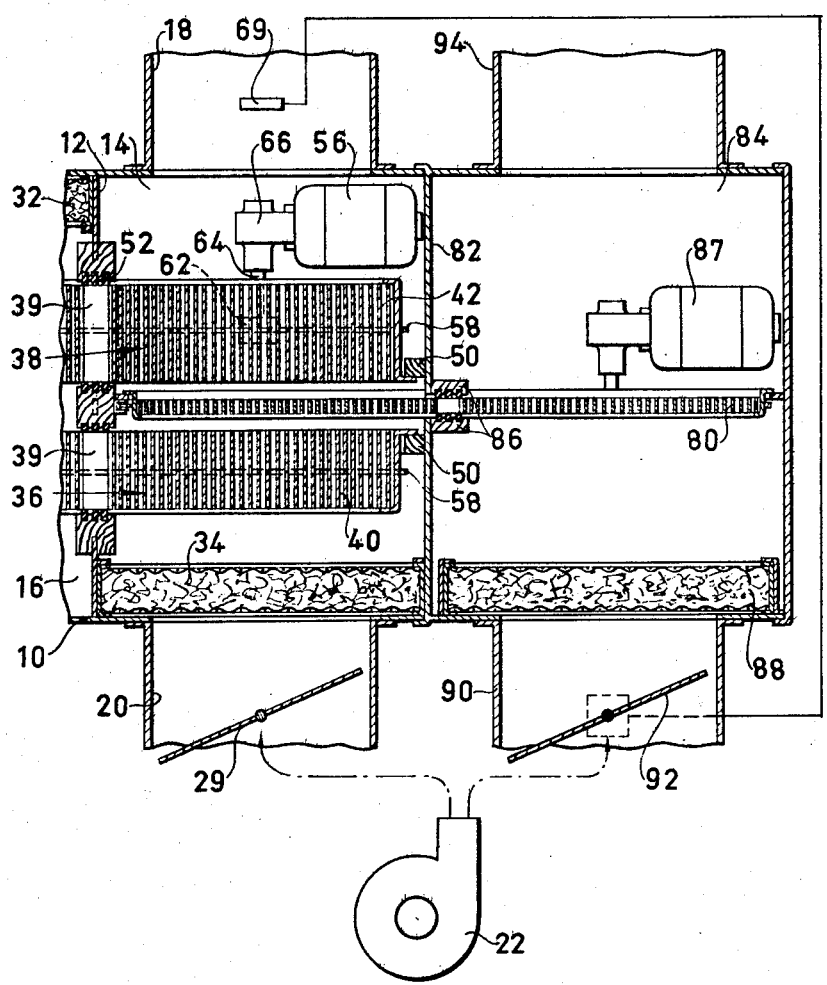
FIG. 3 is a partial sectional view of an exchanger constructed according to a modified embodiment of our invention, the portion cut off on the left side of the figure corresponding to the left hand portion of FIG. 1.

The embodiment shown in FIG. 3 differs from the preceding one by the heating battery 68 being replaced by a rotor 80 extending through the boundary wall 82 of the passage 14 into a third passage 84. The rotor 80, the outer circumference of which is indicated in FIG. 2 by a dash and dotted line, is a heat exchanger without moisture transfer properties. It is constructed and mounted in substantially the same manner as the rotors 36 and 38 but is considerably thinner. The material in the rotor 80 shall be completely or almost non-hygroscopic as is the case with metal sheet or some kinds of plastic sheet material. It co-operates with packings 86 minimizing leakage between the passages 14 and 84. A geared motor 87 drives the rotor 80. The passage 84 is connected through a filter 88 and a pipe socket 90 to the fan 22. Said fan feeds consumed air of the room to the passage 14 and in a minor degree to the passage 84. The pipe socket 90 includes a valve member such as a damper 92, adapted to be actuated by the hygrostat 69. The air stream leaving the passage 84 returns through a pipe socket 94 into the room.

In the embodiment just described the temperature of the incoming fresh air in the passage 16 behind the rotor 38 is always lower than that of the air of the room so as to cause the rotor 36 to transfer heat from the air escaping from the room to said fresh air. If the air of the room has a temperature of +20° C., the temperature drop in the rotor 36 may proceed to about +12°. The rotor 80 then heats the air in the passage 14 to +15°, for example. The fresh air on the other hand leaves the rotor 38 with a temperature slightly below that of the air escaping from the room after the passage thereof through the rotor 36. The heat exchange in the rotor 36 raises the temperature of the fresh air to a value slightly below 20°. When entering the rotor 80 the stream of air of the room escaping through the passage 84 has a temperature of +20° and the drop in temperature within said rotor is dependent in the intensity of the air stream.

If the escaping air stream does not need heat transferred thereto the rotor 80 is allowed to have a standstill, and at the same time the intake 90 is closed by means of the damper 92.

Figure 4:
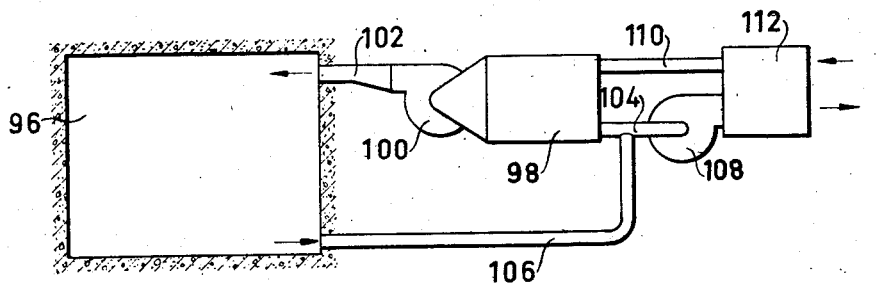
FIG. 4 is a diagrammatic view of the exchanger attached to a convenient air conditioning aggregate.

In FIG. 4 the reference numeral 96 denotes a room which is conditioned by means of an aggregate 98 of conventional construction. This known aggregate comprises a moistening device and a refrigerator or heating device. The aggregate may be constructed to influence the air of the room during both winter and summer. It communicates with the room through a fan 100 and an air intake conduit 102. In usual manner a conduit 106 through which the air of the room escapes from the room 96, is connected to an outlet conduit 104 extending from the aggregate and opening into the atmosphere. In this way the air escaping from the room can be divided into two air streams of which one is returned to the aggregate and into the room while the other is discharged into the atmosphere, possibly by means of a fan 108. The ratio between the quantity of air returned to the aggregate and the quantity of air escaping into the atmosphere is practically often so high as 4:1. The air returning to the aggregate is mixed with the fresh air taken in into said aggregate through a conduit 110.

An exchanger 112 constructed according to the invention is connected to the fan 108 and the conduit 110. This exchanger makes now possible to transfer the excess of moisture and heat present during winter in the air escaping from the room to the incoming fresh air. During summer the conditions are reversed in accordance with the statement given above. Due to the improved heat economy and moisture transfer, respectively, of the exchanger the share of fresh air in the air stream entering the room can be increased considerably. Thus up to one-half of the air escaping from the room through the conduit 106 may pass through the exchanger 112 into the atmosphere, a corresponding minor quantity of air thus being returned to the aggregate 98 to be mixed in this latter with fresh air supplied through the conduit 110.

The heat and moisture exchanging material in the rotors if of filamentous shape has hygroscopic properties in the manner described above. In order to produce high coefficients of transfer it is important that the filaments are thin. When having a circular cross-section they may have a diameter of the order of magnitude less than 0.2 mm., and preferably less than 0.1, such as 0.02–0.05 mm. Further the clearances between the filaments must be narrow.

The rotor 36 may rotate with a higher than, the same as or a lower number of revolutions than the rotor 38. The transfer body of the rotor 38 has in the embodiments a larger axial dimension than the rotor 36. However, said rotors while otherwise being of the same structure may have the same axial length or the rotor 36 may even be smaller. This implies that their transfer capacity at a certain number of revolutions may be the same or even that of one rotor larger than that of the other rotor.

Our invention is also applicable to ventilation of freezing or cold storage rooms which case mostly approaches the case of winter conditions described above except that one difference only that the room has the lower temperature and moisture content so that heat and moisture must be prevented from penetrating into the room.

In order to avoid precipitation of moisture in the rotor 38 the air stream may be deprived of part of its moisture content behind the rotor 36. For this purpose the rotor 80 may be made of a hygroscopic material in a similar way as the other rotors. In connection with FIG. 3 there has been pointed out that the temperature of the air in the passage 14 is lower behind the rotor 36 than in the room. Further the relative moisture content is increased so as to be higher behind the rotor 36 than in the room and in connection herewith on the intake side of the passage 84. By sufficiently slow rotation the the rotor 80 now may be caused to transfer moisture from the air stream in the passage 14 to the air stream in the passage 84 without heat to an appreciable degree passing over to the latter stream. Alternatively the rotor 84 may serve for both supply of heat to and removal of moisture from the passage 14.

The rotor 36 and/or the rotor 80 may be replaced by the rotor constructed according to the patent application Serial No. 485,632, filed concurrently herewith, now Patent 2,925,880. The main object of the rotor 38 will then be to transfer heat between the two gas or air currents or streams.

While several more or less specific embodiments of our invention have been described, it is to be understood that this is for purpose of illustration only and that our invention is not to be limited thereby, but its scope is to be determined by the appended claims.

What we claim is:

1. In an air conditioning system for an enclosure, a combined heat and moisture exchanger between the incoming air and the outgoing air comprising, a housing provided with a separate air passage for each of the air currents, a pair of transferrers arranged in the two passages and mounted to move cyclically between said passages, heating means located in one of the passages for heating the incoming air, both passages communicating at one end with the outdoors and communicating at the other end with the enclosure, one of the transferrers being located between the heating means and the enclosure and having hygroscopic qualities and being adapted for the transfer of both heat and moisture, the second transferrer being located between the heating means and outdoors and being adapted for heat transfer.

2. In an air conditioning system for an enclosure, a combined heat and moisture exchanger between relatively cold air coming into the enclosure and relatively warm air going out therefrom, means defining a separate passage for each of the two air streams, each of said passages communicating at one end with the enclosure, and at the other end with outdoors, a transferrer body arranged across both of said passages and mounted to move cyclically between said passages to transfer thermodynamic characteristics of the air from one of said passages to the other one, means in one of said passages for heating the incoming air before it comes into contact with said transferrer body, said transferrer body having hygroscopic qualities and being adapted for both heat and moisture exchange.

References Cited in the file of this patent

UNITED STATES PATENTS

| | | |
|---|---|---|
| 1,409,520 | Bird | Mar. 14, 1922 |
| 2,700,537 | Pennington | Jan. 25, 1955 |
| 2,803,439 | Fikenscher | Aug. 20, 1957 |

FOREIGN PATENTS

| | | |
|---|---|---|
| 1,068,660 | France | June 30, 1954 |